US007810453B2

(12) United States Patent
Craft

(10) Patent No.: US 7,810,453 B2
(45) Date of Patent: Oct. 12, 2010

(54) POULTRY FLOORING SYSTEM

(76) Inventor: Raymond Craft, 5601 Silver Oak Ct., Rockville, MD (US) 20855

( * ) Notice: Subject to any disclaimer, the term of this patent is extended or adjusted under 35 U.S.C. 154(b) by 316 days.

(21) Appl. No.: 11/878,754

(22) Filed: Jul. 26, 2007

(65) Prior Publication Data

US 2009/0025646 A1 Jan. 29, 2009

(51) Int. Cl.
*A01K 31/18* (2006.01)
(52) U.S. Cl. ...................................... 119/442
(58) Field of Classification Search .......... 119/342, 119/442, 450, 525, 527, 530; 52/79.5, 16; 47/29.5, 31, 31.1; 472/92–93
See application file for complete search history.

(56) References Cited

U.S. PATENT DOCUMENTS

| | | | | |
|---|---|---|---|---|
| 1,157,595 A | * | 10/1915 | Sharp | 119/342 |
| 2,641,224 A | | 6/1953 | Seidel et al. | |
| 3,242,904 A | | 3/1966 | Rannou | |
| 3,326,186 A | | 6/1967 | Doll | |
| 3,641,983 A | | 2/1972 | Keen et al. | |
| 3,677,229 A | * | 7/1972 | Blough et al. | 119/448 |
| 3,687,330 A | | 8/1972 | Herolzer | |
| 3,718,119 A | * | 2/1973 | Stevenson | 119/442 |
| 3,760,769 A | | 9/1973 | Erfeling | |
| 3,762,372 A | * | 10/1973 | Mente et al. | 119/448 |
| 3,900,006 A | * | 8/1975 | Shockley, Jr. | 119/457 |
| 3,948,219 A | * | 4/1976 | Groppel | 119/442 |
| 4,148,276 A | | 4/1979 | Schmidt | |
| 4,208,279 A | * | 6/1980 | Varani | 210/613 |
| 4,213,422 A | * | 7/1980 | Nagel et al. | 119/439 |
| 4,235,197 A | * | 11/1980 | Curtis et al. | 119/530 |
| 4,430,960 A | * | 2/1984 | Nagel et al. | 119/439 |
| 4,474,137 A | | 10/1984 | Walters | |
| 4,768,465 A | * | 9/1988 | Church | 119/442 |
| 5,014,369 A | * | 5/1991 | Daus | 4/503 |
| 5,099,795 A | | 3/1992 | Nagel | |
| 5,136,980 A | * | 8/1992 | Schoeber et al. | 119/448 |
| 5,148,771 A | * | 9/1992 | Schuett et al. | 119/479 |
| 5,426,899 A | * | 6/1995 | Jones | 52/63 |
| 5,596,951 A | * | 1/1997 | Lagadec | 119/525 |
| 5,732,658 A | * | 3/1998 | Wolters et al. | 119/450 |
| 5,785,148 A | * | 7/1998 | Wildner | 182/138 |
| 5,865,143 A | * | 2/1999 | Moore, Jr. | 119/442 |
| 6,029,556 A | * | 2/2000 | Rexroad | 87/22 |

(Continued)

FOREIGN PATENT DOCUMENTS

EP 0 612 468 A1 8/1994

(Continued)

*Primary Examiner*—Michael R Mansen
*Assistant Examiner*—Ebony Evans
(74) *Attorney, Agent, or Firm*—Berenato & White, LLC

(57) ABSTRACT

A poultry flooring system, comprising a housing structure having four walls and a floor; a substantially inelastic film member raised above the floor to provide a raised floor structure. The inelastic film member comprises apertures to permit waste products and ventilation to pass through the inelastic film member; wherein the inelastic film structure is maintained under tension to reduce need for independent support structures between the film member and the floor. In a preferred embodiment, an air bag system or other mechanical support system is used to reduce sag in the inelastic film supported under tension, whereby the inelastic film may be easily raised and lowered during use and harvest.

4 Claims, 8 Drawing Sheets

U.S. PATENT DOCUMENTS

| | | | |
|---|---|---|---|
| 6,276,304 B1* | 8/2001 | Tai | 119/448 |
| 6,338,316 B1 | 1/2002 | Weaver | |
| 6,450,125 B2* | 9/2002 | McElroy | 119/529 |
| 6,470,827 B2 | 10/2002 | Nannemann | |
| 6,871,842 B2* | 3/2005 | Sutton | 254/342 |
| 7,194,979 B2* | 3/2007 | Moore, Jr. | 119/448 |
| 7,383,597 B2* | 6/2008 | Steiner | 5/121 |
| 2003/0013559 A1* | 1/2003 | Gordon | 473/415 |
| 2004/0079040 A1* | 4/2004 | MacLean et al. | 52/302.1 |
| 2007/0006815 A1 | 1/2007 | Correa et al. | |
| 2008/0041539 A1* | 2/2008 | Muehlebach | 160/368.1 |

FOREIGN PATENT DOCUMENTS

| | | |
|---|---|---|
| GB | 2 103 915 A | 3/1983 |

* cited by examiner

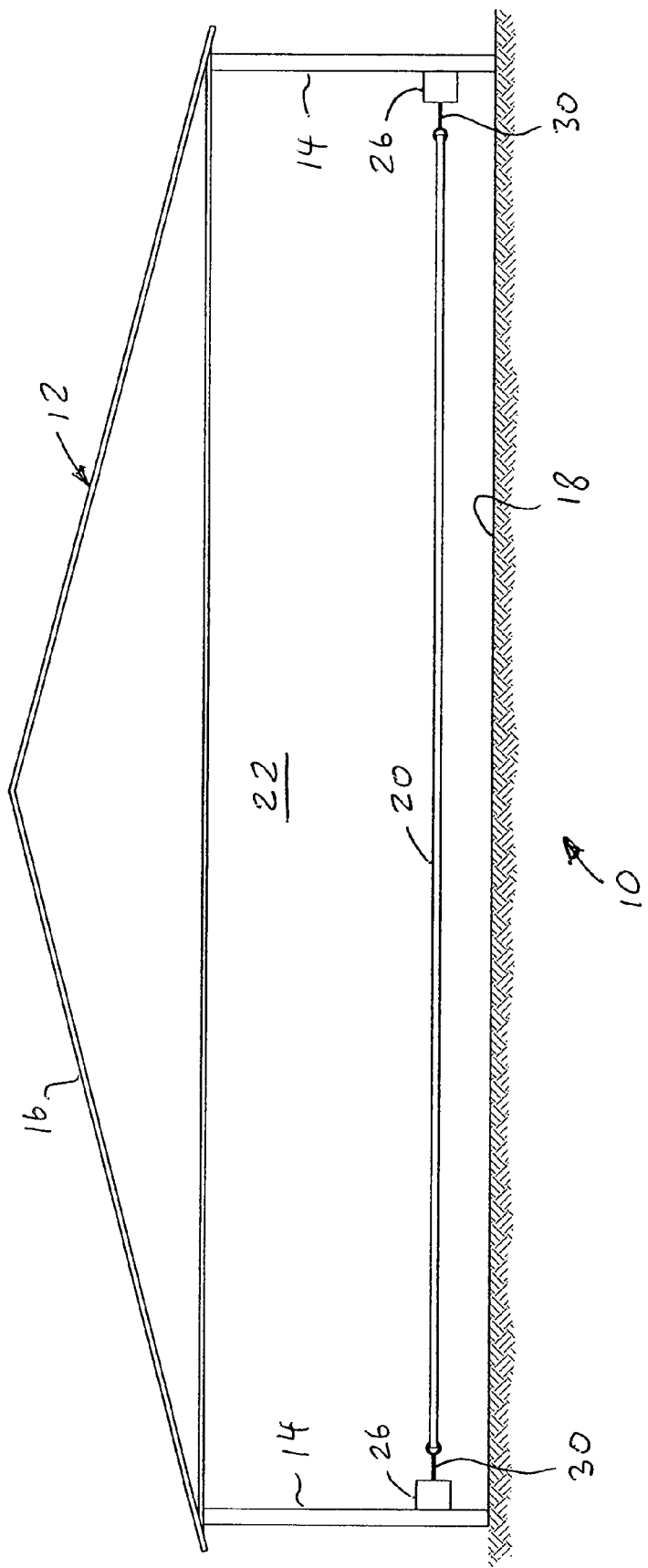

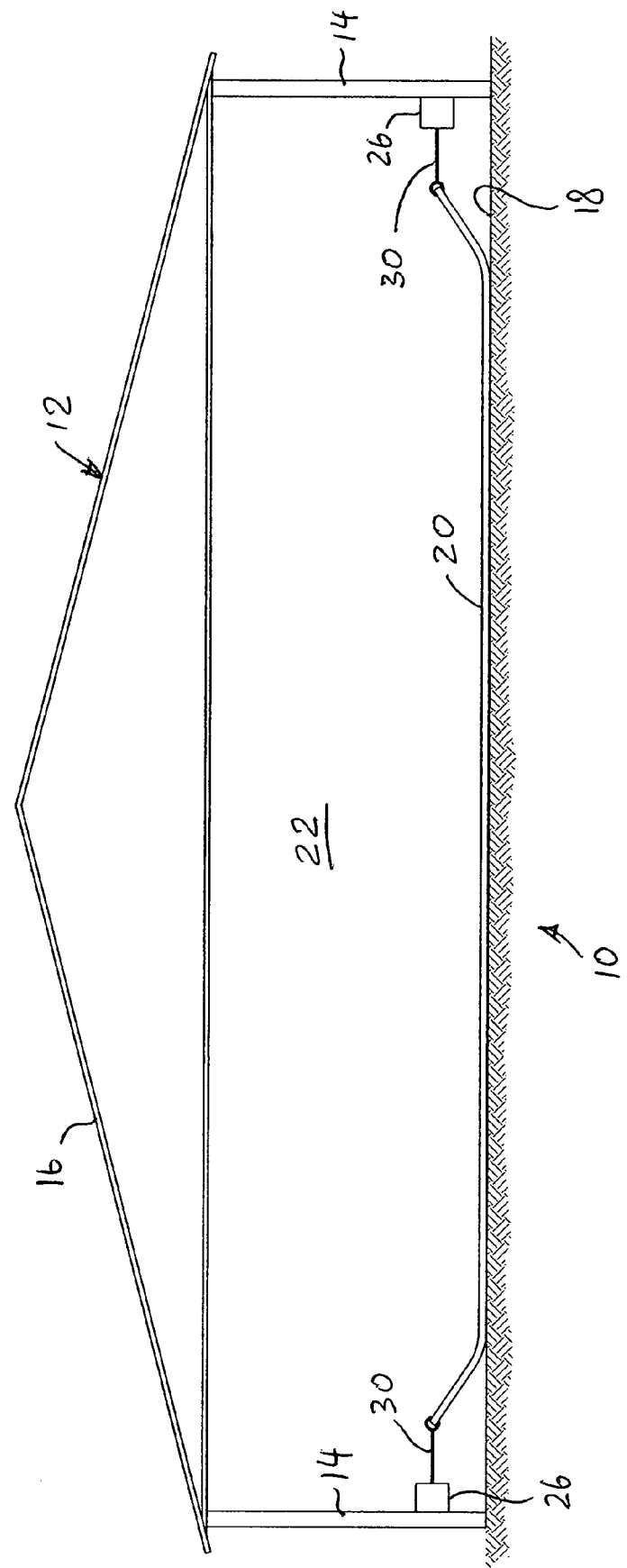

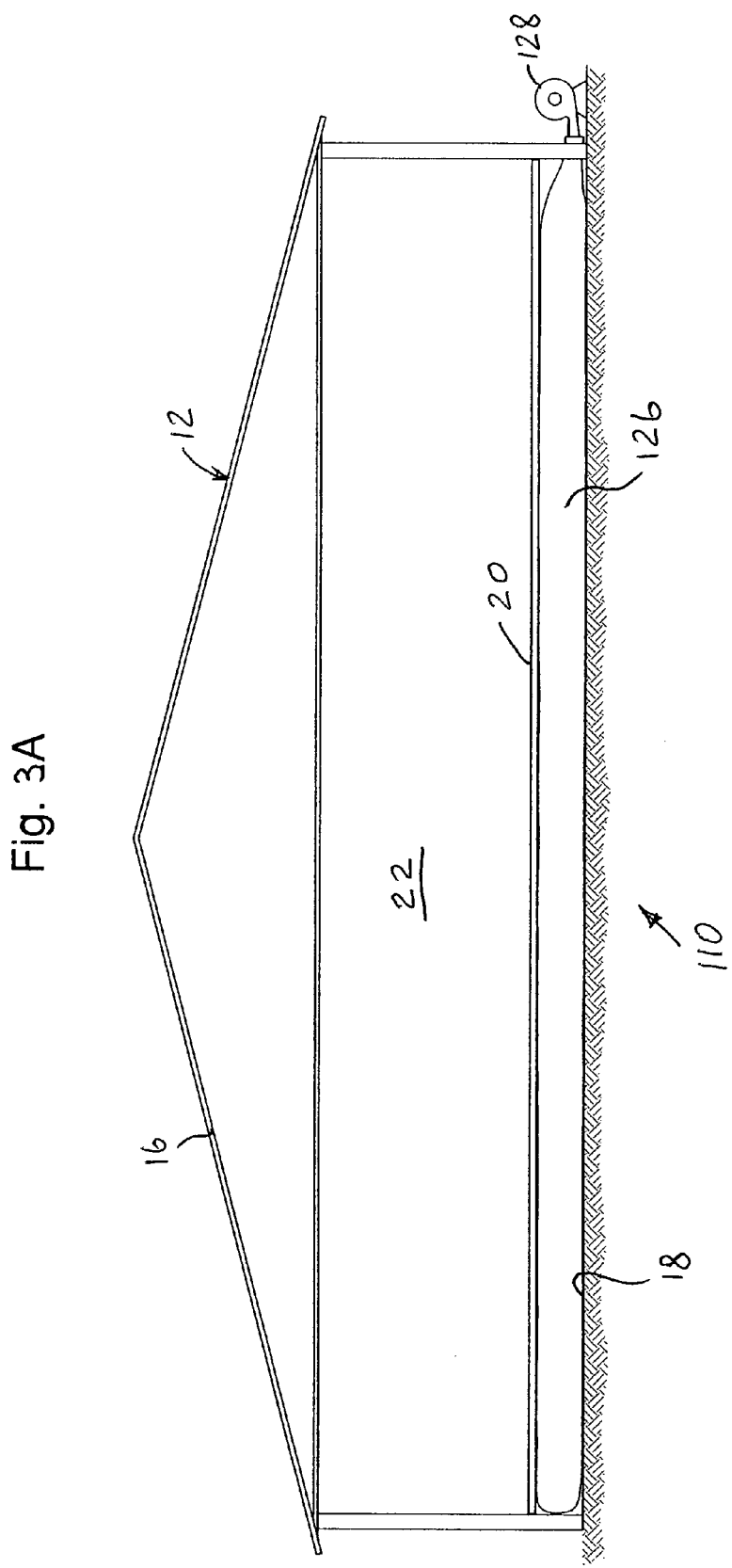

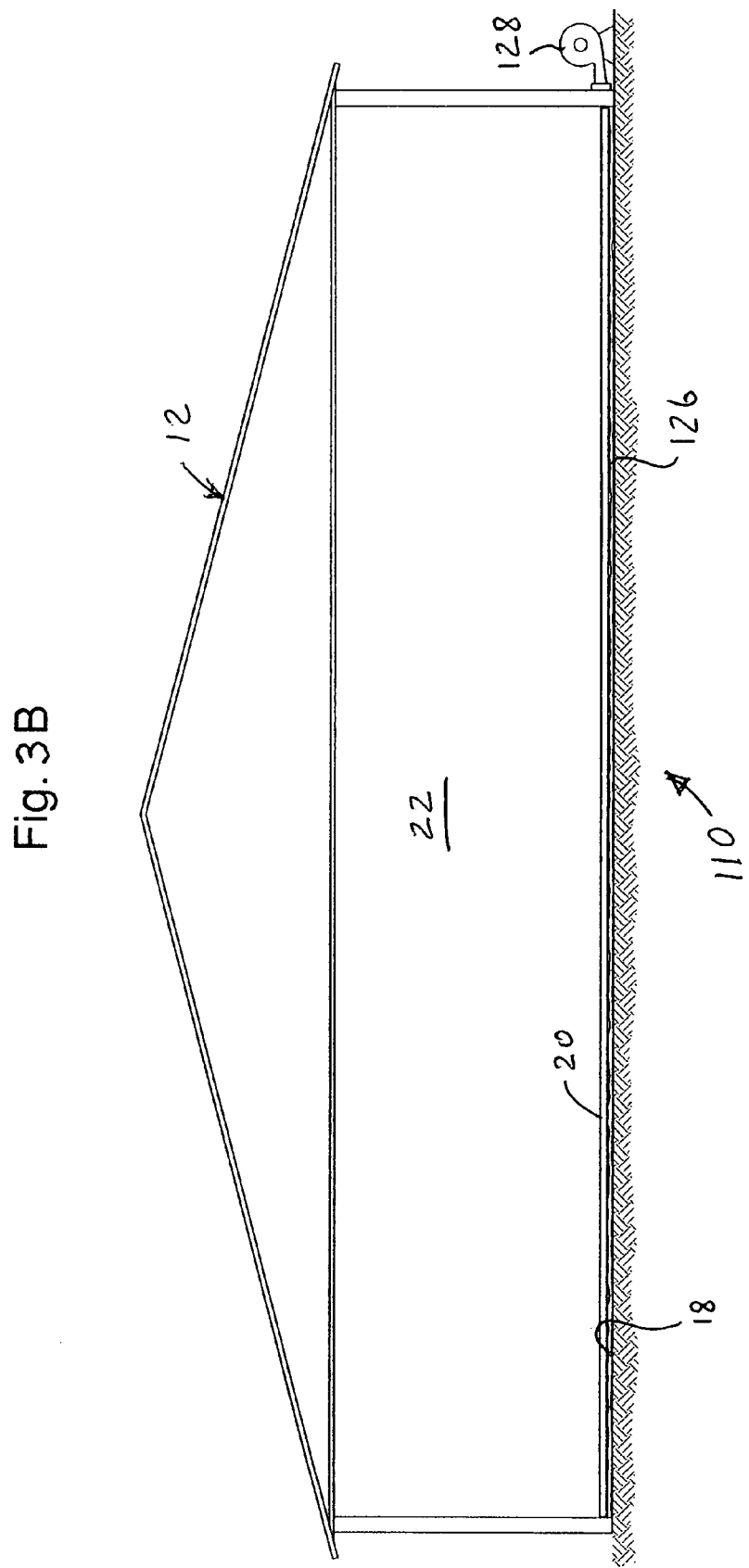

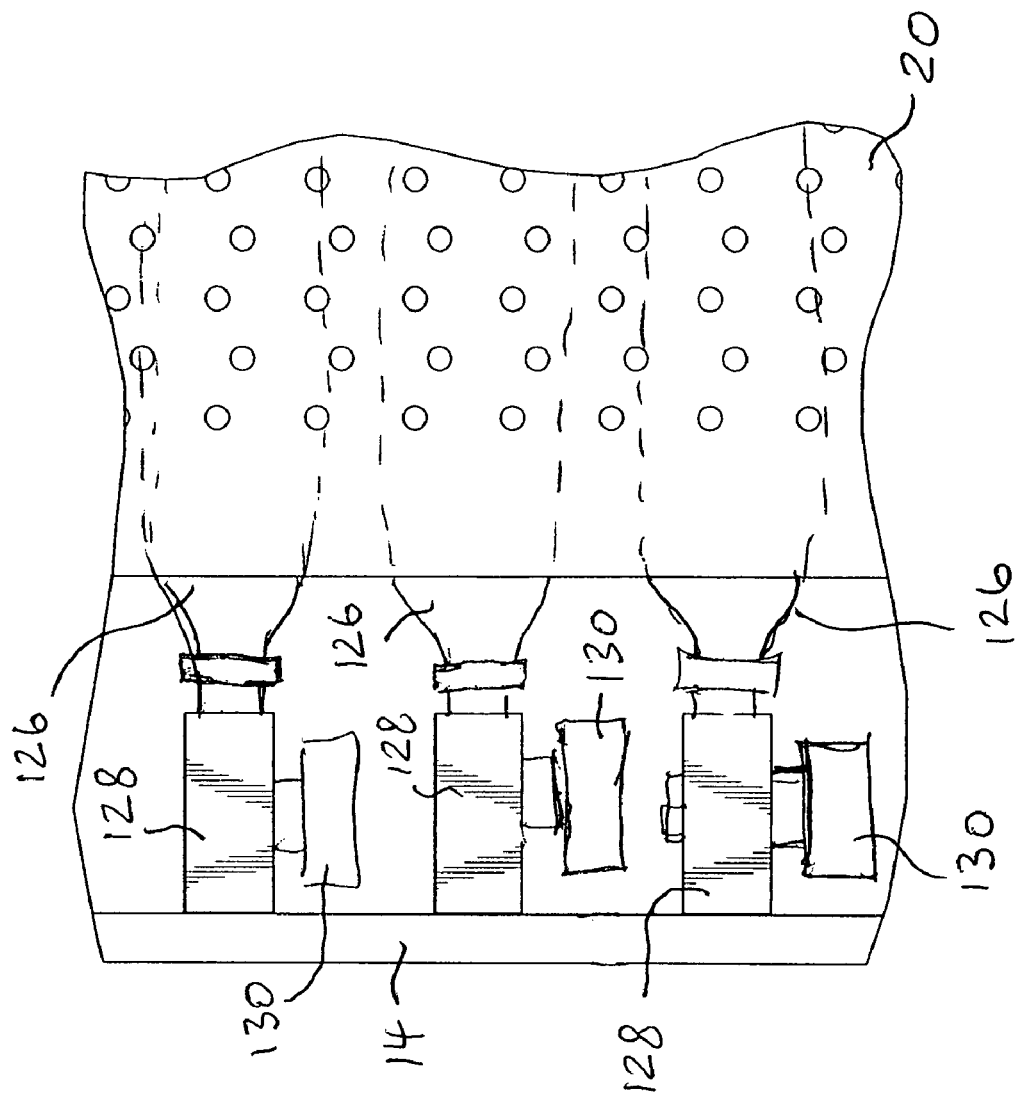

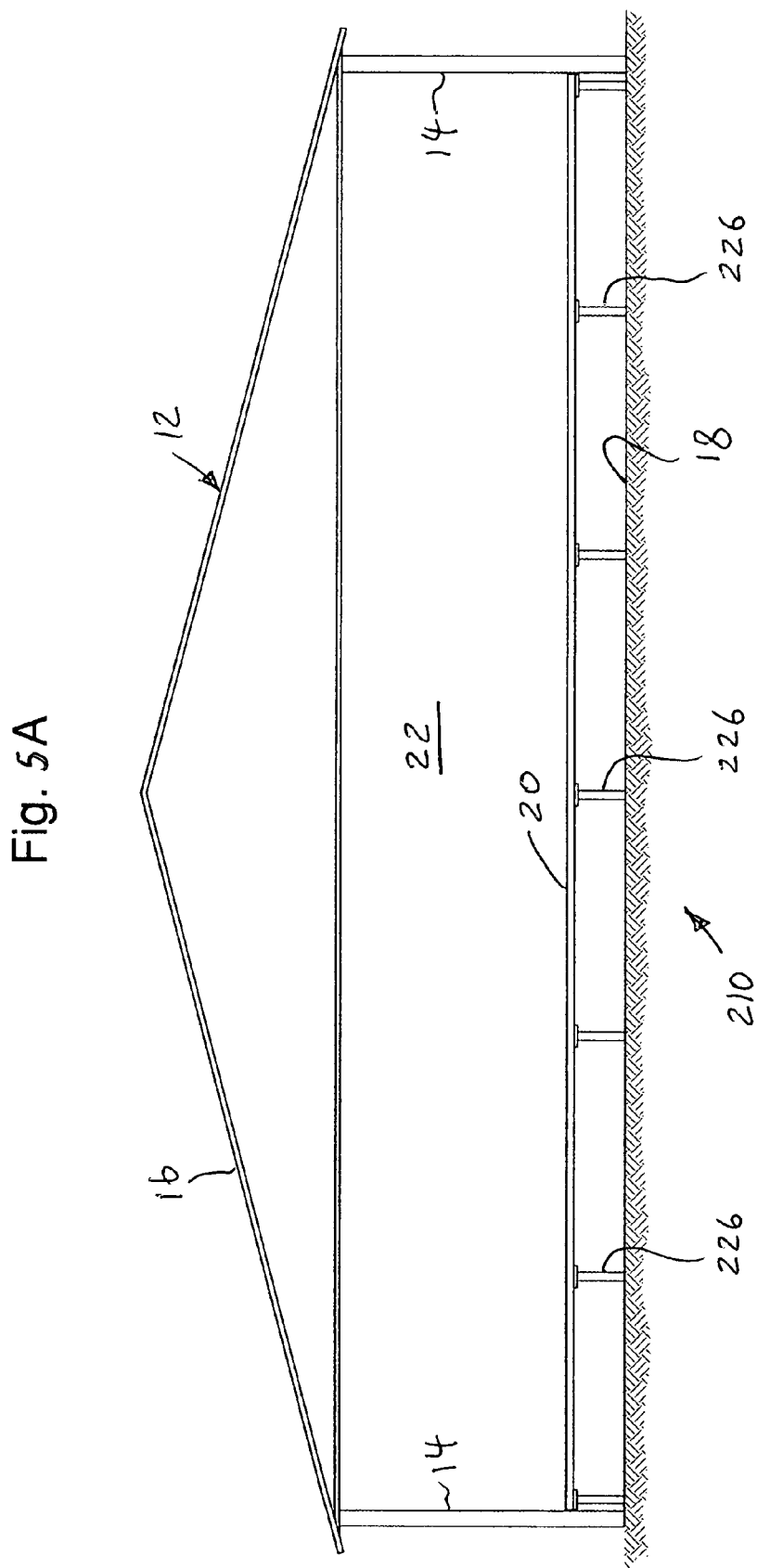

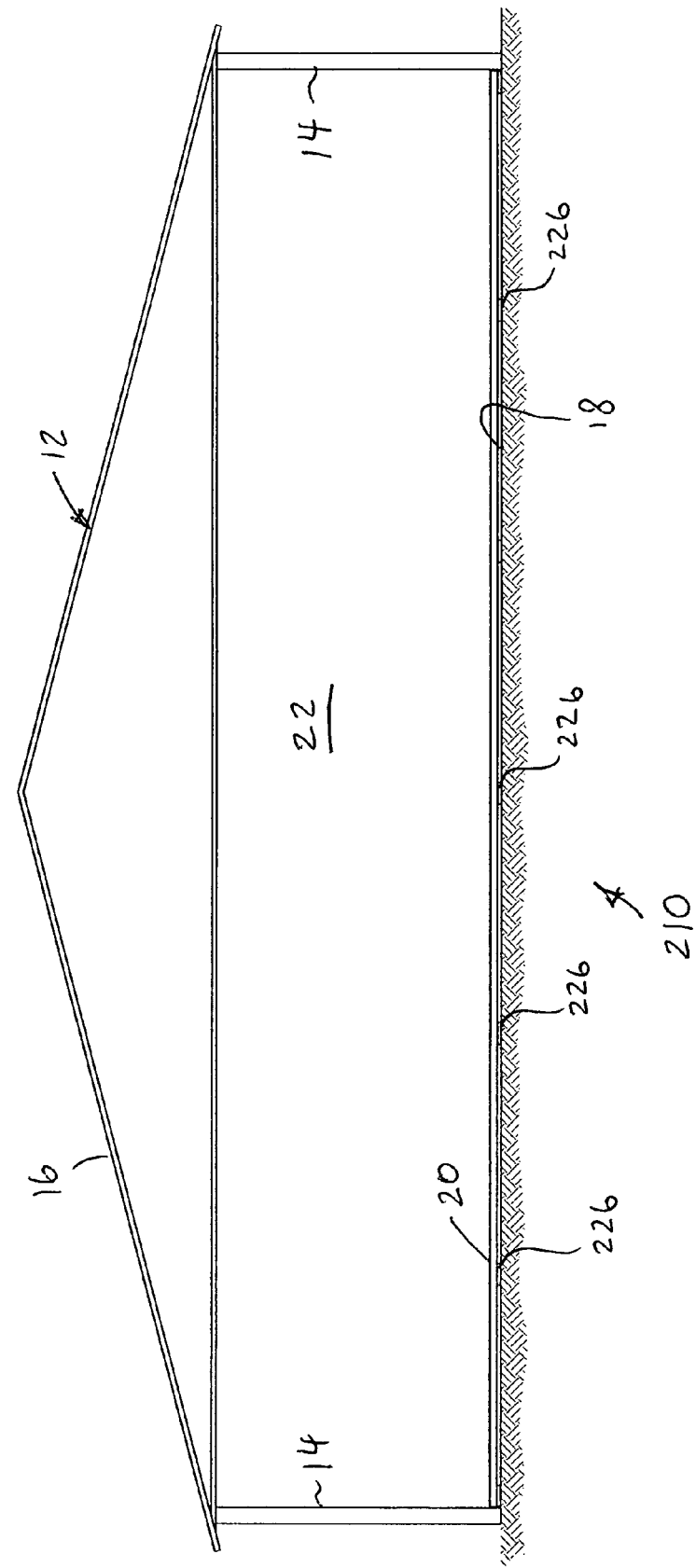

POULTRY FLOORING SYSTEM

BACKGROUND OF THE INVENTION

1. Field of Invention

The present invention relates generally to improvements in new and existing chicken house structures and methods of operation which provide uniformity of floor surface, reduce air-borne contaminants, copraphagia, emissions and pathogens, while concurrently improving carbon dioxide removal, meat performance, chicken manure removal, chick brooding and overall chicken welfare, leading to a more economical and humane operation during the growing process. Further, improvements in work environment and waste disposal in the poultry-growing environment are expected. Management efficiency through decreased time interval between growth cycles will be improved.

2. Description of Related Art

The chicken growing industry is based on mass production and low margin in which production casualties or weight reduction that might be considered trivial in other commercial activities can be detrimental to production cost. The magnitude of the industry is evident from the fact that a typical chicken house (approximately 40 to 60 feet by 500 to 600 feet) will house 25,000 to 45,000 birds per flock. At harvest time, a typical commercial chicken house can have a density of 0.8 square feet per chicken or 7.5 lbs/square foot. Each bird will have consumed an average of 1.8 lbs. of feed per pound of chicken and an average of 2.25 gallons of water per pound of chicken by harvest time. Forty percent of the feed and water is consumed during the last week of growth. Broilers are grown to an average of 5.5 lbs. and roasters to an average of 7.25 lbs. The total amount of manure deposited on the floor bedding during each growth cycle is approximately 150,000 lbs. The total amount of excreted water is approximately 50,000 gallons, which makes it impossible to achieve and/or maintain bedding dryness under existing chicken house conditions.

Wet manure and saturated bedding, along with the massive animal heat generated by so many birds, results in perfect environmental conditions for pathogen development and promulgation. Unfortunately, the widespread use of evaporative coolers for reducing the temperature can be counterproductive in that it results in high humidity, which is also conducive to ammonia and pathogen production. As the bacteria feeds on the manure and multiplies, it produces large amounts of ammonia gas, as well as methane gas. The use of ventilation systems for removing ammonia and other gasses is not a satisfactory solution since such use can have undesirable results such as the introduction of cold air into the facility during cold weather with minimal ventilation.

It has been the practice of the poultry industry to require producers to meet certain minimal chicken house conditions. These requirements include providing a compacted dirt floor. Over this dirt floor, three (3) inches of bedding (wood chips, sawdust, straw, chopped cardboard, etc., sometimes referred to as "litter") are required. The intended purpose of this bedding litter is to provide insulation from the ground and to have the capacity to absorb moisture from the chicken manure.

Another requirement for producers is to provide ventilation capable of changing the total air in the chicken house once per minute during warm weather (tunnel ventilation) and to provide minimum ventilation capable of changing the total air by cross ventilation every 6 to 8 minutes in cold weather, in addition to maintaining a required temperature, water and forage. Such ventilation requirements are not energy efficient.

Conventional chicken house design and ventilation technology in use today consist of tunnel ventilation in warm weather and minimal cross ventilation in cold weather. The humidity retained in the litter, along with the undigested feed and uric acid found in chicken manure, creates a uniquely productive environment for pathogen development and development of ammonia, carbon dioxide, hydrogen sulfide, methane, bacteria and fungus/mold. The present invention is directed to apparatus and methods for alleviating the foregoing problems.

Laminar ventilation of conventional chicken houses in warm weather is provided by a series of exhaust fans located at one end of the elongated chicken house that pulls air through the length of the house (exhaust). On the opposite end of the elongated chicken house, ambient air is pulled through cold water saturated cooling pads (intake) that cool and saturate the air which then travels along the length of the chicken house and is exhausted by the exhaust fans.

The above-described ventilation cooling method suffers from additional shortcomings due to the inability of the moisture-saturated air to absorb additional moisture from the bedding. As the bedding becomes saturated with water and manure, and with the lack of natural light, substantial heat is generated by the bedding thus raising the temperature surrounding the chickens. An environment is thus created for multiplying bacteria and fungus/molds. Moreover, the water-saturated air enhances uric acid decomposition and resultant carbon dioxide and ammonia, as well as methane, emissions. The additional water in the saturated air also increases bacterial production of ammonia in the litter.

Another problem with conventional tunnel ventilation is that it causes the chickens to migrate toward the incoming air seeking fresh oxygenated air, packing themselves in tightly on the air intake end, and causing injuries and bruises. This migration also increases the concentration of manure in this area and also reduces the area for natural water absorption by the bedding, since the chickens defecate in a reduced floor area, which prevents the bedding from evaporating the liquid and precludes bedding drying.

Chicken collection for marketing in today's chicken houses is done manually, or with mechanized catching equipment to a small degree. The manual method consists of several workers (chicken catchers) that chase, catch and hold the birds by their feet. By placing one chicken leg between each finger until they have a hand-full, the chickens are then placed in a cage at a prescribed number. When the cage is full, it is picked up by a forklift and loaded onto a truck for transportation to the processing plant. The mechanized method consists of a self-propelled or motorized vehicle, equipped with a conveyor to carry the chickens out in order to later manually place them in the cage. At the entrance of the conveyor there are two inwardly rotating wheels/brushes; some with rubber fingers, others use plastic materials to pull the chicken onto the conveyor, while simultaneously workers are corralling the chickens toward the conveyor entrance of the machine.

There is a large body of information available with the recommended brooding temperatures during this critical time. All these recommendations are made with the assumption that the starting point is clean dry bedding. The bedding materials used today are absorbent and not able to dry during chicken house down time (typically 13 days) as the manure blocks any ventilation that would be necessary to accomplish this process. As the chicken house is prepared for brooding the temperature is raised above 95° F. Not only is this extremely energy inefficient, but it causes the evaporation of the urine retained by the bedding of the previous flock. This chemical reaction produces large amounts of ammonia gas as well as carbon dioxide. Although the house is at 95° F., the evaporation at floor level where the baby chicks are placed creates a cooling effect. This creates a very poor environment for the baby chicks as their needs are warmth and fresh or properly oxygenated air.

Various designs of manufactured flooring have therefore been developed over the years to attempt to allow the collection of the waste material beneath the floor for removal and further use regularly without disturbing the flock above. In many cases this type of flooring does not allow an operative to properly enter the area where the birds are kept so as to provide the necessary culling or catching of the birds. In some cases this is overcome by providing as the flooring a conveyor belt which will move toward one end at which the birds can be grasped or dead birds removed.

However this type of flooring in many cases has a severe disadvantage that is the birds tend to sit upon transverse wires or strips which support the floor and thus cause indentation in the breast resulting in crooked keel bones and in some cases unsightly breast blisters which are unacceptable in broilers and require the birds to be culled due to health standards and to be used only for soup. Little success has therefore been obtained in providing a flooring which overcomes all of these requirements and while many of the new designs of flooring have been tried, very little commercial success has been attained.

SUMMARY OF THE INVENTION

The need exists for an apparatus and method that overcome the technical problems of existing chicken houses and the established inefficient operating procedures currently being followed, and that avoid the use of traditional bedding or litter and which provide for better control of ventilation, temperature and humidity.

In accordance with this invention, a flooring system is provided to raise poultry without the need for "litter", i.e. an absorbent material, for feces and waste generated by the animals raised. Specifically, an inelastic film material is provide that, under tension, supports the weight of the production process, while allowing the free flow of feces down through the film and ventilation at the level of the bird.

An important point is the ability to place the material under tension. Tension itself may be derived in one of several ways. Air-pressure support bags with the material film being attached to the perimeter of the inside of the "house" would be a cost effective method supporting the flooring in a manner that may be quickly and easily lowered by depressurizing the air-pressure support bags. Support of the flooring could also be accomplished by a mechanical tensioning or hydro-mechanical means.

The material itself must be virtually inelastic and preferably meets the following criteria: allow passage of fecal material from the birds to the subflooring, meet federal rules for food contact material, be fire resistant or retardant, not off-gas any material affecting workers or animals housed, be resistant to UV degradation, minimize any injury to birds including hock entrapment and breast blisters, be cost effective, easy to work with such as repair or partial removal, stand up to repeated cycles of production, generate no waste in off itself, i.e. be recyclable, be animal friendly, i.e. generate less stress or injury to birds than current methods. Presently, a vacuum-formed reinforced laminate is the preferred inelastic film known to work adequately for this invention.

The potential benefits of this invention would include, but not be limited to,: reducing the "litter" waste such as wood shavings etc.; reducing the turn around time for starting a new cycle of production; reducing the costs associated with supplying current "litter"; reducing the exposure of humans and birds to air born pathogens associated with "litter" waste; reducing the number of bacterial, viral and fungal and protozoan pathogens in contact with the birds; supplying better air circulation at the floor level to increase the oxygen levels, control bird level humidity, and temperature; possible delivery of medications thru the air at bird level; more humanely treat poultry both during the growth and harvest phases; resultant waste of the birds would be concentrated and may become in itself a valued commodity.

BRIEF DESCRIPTION OF DRAWINGS

FIG. 1A is a schematic view of a poultry flooring system according to a first exemplary embodiment of the present invention showing an inelastic film member in an operative position;

FIG. 1B is a schematic view of the poultry flooring system according to the first exemplary embodiment of the present invention showing the inelastic film member in an inoperative position;

FIG. 3A is a schematic view of a poultry flooring system according to a second exemplary embodiment of the present invention showing an inelastic film member in an operative position;

FIG. 3B is a schematic view of the poultry flooring system according to the second exemplary embodiment of the present invention showing the inelastic film member in an inoperative position;

FIG. 4 is a partial top view of the poultry flooring system according to the second exemplary embodiment of the present invention;

FIG. 5A is a schematic view of a poultry flooring system according to a third exemplary embodiment of the present invention showing an inelastic film member in an operative position;

FIG. 5B is a schematic view of the poultry flooring system according to the third exemplary embodiment of the present invention showing the inelastic film member in an inoperative position.

DETAILED DESCRIPTION OF PREFERRED EMBODIMENTS

Figure 2:
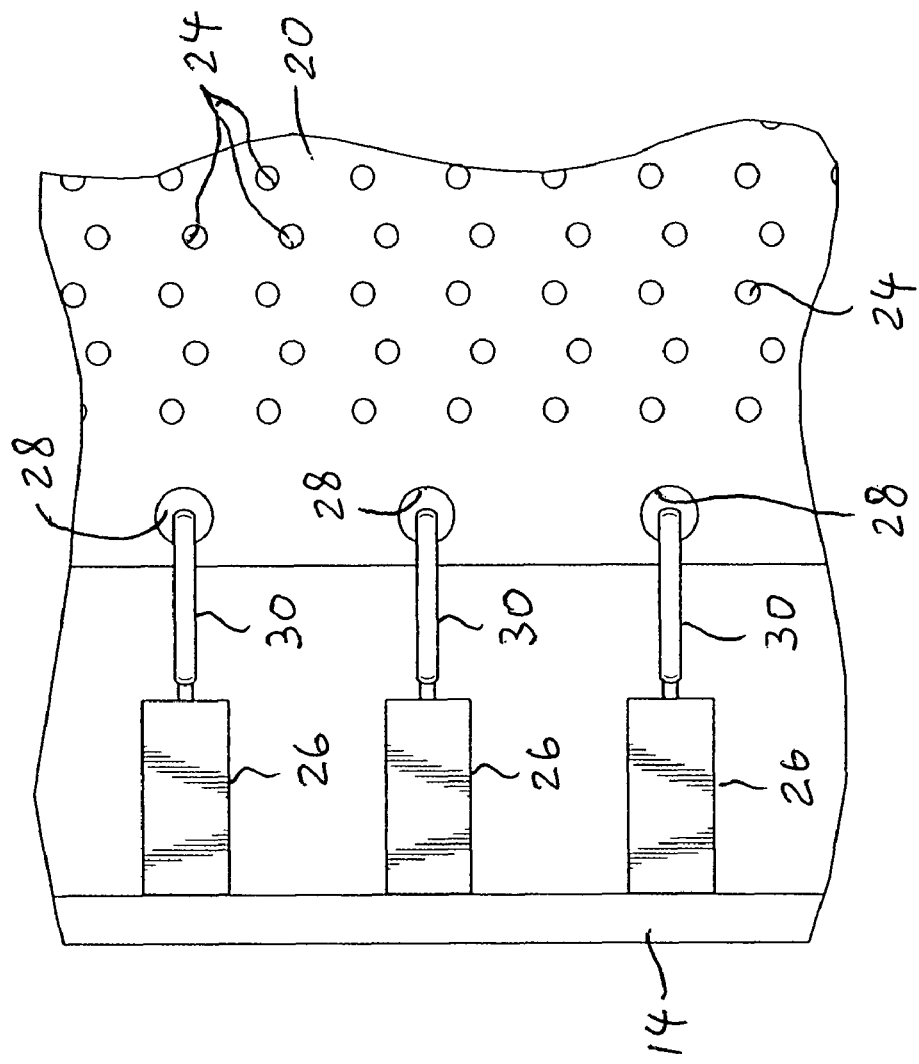
FIG. 2 is a partial top view of the poultry flooring system according to the first exemplary embodiment of the present invention.

The preferred embodiments of the present invention will now be described with the reference to accompanying drawings.

For purposes of the following description, certain terminology is used in the following description for convenience only and is not limiting. The words such as "outer" and "inner", "left", "right", "top" and "bottom" designate directions in the drawings to which reference is made. The terminology includes the words specifically mentioned above, derivatives thereof and words of similar import. Additionally, the word "a", as used in the claims, means "at least one".

FIGS. 1A, 1B and 2 of the drawings illustrate a first exemplary embodiment of a poultry flooring system, generally depicted by the reference character 10. The poultry flooring system 10 comprises a housing structure 12 having four walls 14, a roof 16 and a floor 18. The poultry flooring system 10 further comprises a substantially inelastic film member 20 raised above the floor 18 to provide a raised floor structure and a chicken growth chamber 22. In other words, the film member 20 is vertically spaced from the floor 18. As illustrated in FIGS. 1A and 1B, the inelastic film member 20 extends between at least two of the four walls 14 of the housing structure 12 and supports the weight of the production process, i.e. chickens and chicken waste products. The inelastic film member 20 is provided with a plurality of apertures 24 to permit free flow of the chicken waste products through the film member 20 and ventilation through the inelastic film member 20. Preferably, the inelastic film member 20 is made of an appropriate, substantially inelastic material that meets the following criteria: allow passage of fecal material from the birds to the floor 18, meet federal rules for food contact material, be fire resistant or retardant, not off-gas any material affecting workers or chickens housed, be resistant to UV degradation, minimize any injury to birds including hock entrapment and breast blisters, be cost effective, easy to work with such as repair or partial removal, stand up to repeated cycles of production, generate no waste in off itself, i.e. be recyclable, be animal friendly, i.e. generate less stress or injury to birds than current methods. Presently, a vacuum-formed reinforced laminate is the preferred inelastic material (film) known to work adequately for this invention.

It is envisioned that the apertures will be about 1 inch in diameter, and the aperture size may be about $15/16$ inch, and more specifically the preferred size is about $13/16$ inch.

According to the first exemplary embodiment of the present invention, the inelastic film member 20 is maintained under tension to reduce need for independent support structures between the film member 20 and the floor 18. Preferably, the tension of the inelastic film member 20 is created by a plurality of linear actuators 26 provided on at least one side of the inelastic film member 20 and attached to at least one of the opposite walls 14 of the housing structure 12. More specifically, as illustrated in FIG. 2, the inelastic film member 20 includes a plurality of eyelets 28 formed at opposite distal ends thereof. The film member 20 is connected to the linear actuators 26 through a plurality of tensioning rod 30 each engaging the eyelet 28 at one end thereof and connected to the corresponding linear actuator 26 at the other end. It will be appreciated that the linear actuators 26 may be of any appropriate type known in the art, such hydraulic, pneumatic, hydro-mechanical, electromechanical, etc. By maintaining the inelastic film member 20 with the linear actuators 26, the need for independent support structures between the film member 20 and the floor 18 is substantially reduced or altogether eliminated.

Further according to the present invention, the inelastic film member 20 is vertically movable by the linear actuators 26 between an operative position where the film member 20 is vertically spaced from the floor 18 (shown in FIG. 1A), and inoperative position where at least a central portion of the film member 20 is in contact with the floor 18 (shown in FIG. 1B). In the operative position illustrated in FIG. 1A, the linear actuators 26 maintain the inelastic film member 20 in a substantially horizontal position to provide optimum condition for growing the chicken. On the other hand, when the film member 20 is in the inoperative position as illustrated in FIG. 1B, the film member 20 can be easily and conveniently cleaned from the chicken waste.

FIGS. 3A, 3B and 4 of the drawings depict a second exemplary embodiment of a poultry flooring system of the present invention generally depicted by the reference character 110.

Components, which are unchanged from the first exemplary embodiment of the present invention, are labeled with the same reference characters. Components, which function in the same way as in the first exemplary embodiment of the present invention depicted in FIGS. 1A, 1B and 2, are sometimes depicted without being described in detail since similarities between the corresponding parts in the two embodiments will be readily perceived by the reader.

According to the second exemplary embodiment of the present invention, the tension of the inelastic film member 20 is created by one or more air-pressure support bags 126 disposed between the film member 20 and the floor 18, as illustrated in FIG. 3A. The air-pressure support bags 126 support the film member 20 in a manner that may be quickly and easily raised or lowered by pressurizing or depressurizing the air-pressure support bags 126. The positive air pressure for raising the film member 20 is generated by the air flow from one or more blowers 128. The blowers 128 are driven by any appropriate source of power 130, such as one or more electric motors or internal combustion engine, as illustrated in FIG. 4.

In the operative position illustrated in FIG. 3A, the air-pressure support bags 126 inflated by the blowers 128 maintain the inelastic film member 20 in a substantially horizontal position. On the other hand, when the air-pressure support bags 126 are deflated, as illustrated in FIG. 3B, the film member 20 is in the inoperative position (lying on the floor 18) so that the film member 20 can be easily and conveniently cleaned from the chicken waste.

FIGS. 5A and 5B of the drawings depict a third exemplary embodiment of a poultry flooring system of the present invention generally depicted by the reference character 210.

Components, which are unchanged from the first exemplary embodiment of the present invention, are labeled with the same reference characters. Components, which function in the same way as in the first exemplary embodiment of the present invention depicted in FIGS. 1A, 1B and 2, are sometimes depicted without being described in detail since similarities between the corresponding parts in the two embodiments will be readily perceived by the reader.

According to the third exemplary embodiment of the present invention, the tension of the inelastic film member 20 is created by one or more linear actuators 226 disposed between the film member 20 and the floor 18, as illustrated in FIG. 5A, for moving the film member 20 in vertical direction between an operative position shown in FIG. 5A, and an inoperative position, shown in FIG. 5B. The linear actuators 226 support the film member 20 in a manner that may be quickly and easily raised or lowered by extending or retracting the linear actuators 226. It will be appreciated that the linear actuators 226 may be of any appropriate type known in the art, such hydraulic, pneumatic, hydro-mechanical, electromechanical, etc.

In the operative position illustrated in FIG. 5A, the linear actuators 226 are extended to maintain the inelastic film member 20 in a substantially horizontal position. On the other hand, when the linear actuators 226 are retracted, as illustrated in FIG. 5B, the film member 20 is in the inoperative position (lying on the floor 18) so that the film member 20 can be easily and conveniently cleaned from the chicken waste.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

The invention claimed is:

1. A two position poultry flooring and surrounding building system for use in raising poultry, comprising:

a housing structure having walls and a roof suspended thereover a $1^{st}$ floor and a $2^{nd}$ floor suspended above said $1^{st}$ floor, wherein, said $1^{st}$ floor is a solid floor connected to said walls and is provided beneath said suspended $2^{nd}$ floor, said $2^{nd}$ floor being a substantially inelastic film member adapted to be suspended using a moveable suspension means operatively connected around edges of said film member, in an operative first position above said $1^{st}$ floor separate to provide a raised $2^{nd}$ floor structure above said $1^{st}$ floor, a positive pressure ventilation system providing ventilation through said $2^{nd}$ floor structure to poultry persisting on an upper surface of said $2^{nd}$ floor, said inelastic film member comprising apertures to permit poultry waste products from said poultry and supplied ventilation to pass through said inelastic film member so that waste products are substantially continuously separated from the poultry persisting on an upper side of said film member and ventilation is provide through said $2^{nd}$ floor to said poultry; and;

wherein said inelastic film structure is maintained under tension in said operative position to reduce need for independent support structure between said $2^{nd}$ floor film member and said $2^{nd}$ suspended floor moveable via said moveable suspension means to an inoperative second cleaning and servicing position where tension in said $2^{nd}$ floor inelastic member is reduced and said $2^{nd}$ floor inelastic member substantially lays fully upon said solid $1^{st}$ floor and said moveable suspension means remaining attached to said $2^{nd}$ floor.

2. The poultry flooring system according to claim 1, wherein said inelastic film comprises apertures sized to permit poultry waste to pass therethrough.

3. The poultry flooring system according to claim 1, wherein said inelastic film comprises eyelets adapted to receive tension cable affixed therethrough, wherein said tension cable is adapted to be affixed to a wall of said housing structure.

4. The poultry flooring system according to claim 1, wherein said film structure extends between at least two of said walls under tension.

* * * * *